United States Patent [19]

Clay, Jr. et al.

[11] Patent Number: 4,991,639

[45] Date of Patent: Feb. 12, 1991

[54] GUARD MEMBERS FOR PREVENTING SHIFTING CARGO FROM INTEFERING WITH THE OPERATION OF A ROLL-UP DOOR

[75] Inventors: Roy T. Clay, Jr., Snyder; Donald J. Whiting, Akron, both of N.Y.

[73] Assignee: Whiting Roll-Up Door Mfg. Corp., Akron, N.Y.

[21] Appl. No.: 446,978

[22] Filed: Dec. 6, 1989

[51] Int. Cl.⁵ ............................................. B62D 25/06
[52] U.S. Cl. .................................. 160/201; 160/209; 296/106
[58] Field of Search .................. 296/106; 49/488, 501; 160/201, 207, 209, 193

[56] References Cited

U.S. PATENT DOCUMENTS

| | | | |
|---|---|---|---|
| 3,104,699 | 9/1963 | Wolf | 160/201 |
| 3,416,589 | 12/1968 | Lambein | 160/201 |
| 3,518,792 | 7/1970 | Williamson | 49/488 |
| 3,608,613 | 9/1971 | Halliwell | 160/201 |
| 3,841,661 | 10/1974 | Ehrlich | 160/201 |
| 3,848,920 | 11/1974 | Linhart | 160/201 |
| 3,866,686 | 6/1975 | Urbanick | 49/488 |
| 4,403,452 | 9/1983 | Urbanick | 49/501 |

FOREIGN PATENT DOCUMENTS 1346568  2/1974  United Kingdom .

*Primary Examiner*—Reinaldo P. Machado
*Attorney, Agent, or Firm*—Sommer, Oliverio & Sommer

[57] ABSTRACT

This invention provides two forms of improved guards for a roll-up door. The first form (58 or 59) is intended to prevent shifting cargo from intefering with becoming interlocked with the lowered door. This form has a vertically-elongated guard which is adapted to overlie the vertically-spaced hinges, and has opposite marginal end portions closely spaced to the knuckle portions of such hinges. This first form reduces the stepped configuration of prior art hinges, and therefore reduces the opportunity for shifting cargo to become interlocked with the door. The second form (111) is mounted on the door and track, and is designed to prevent shifting cargo from entering the space through which the door must pass as it its raised or lowered.

11 Claims, 4 Drawing Sheets

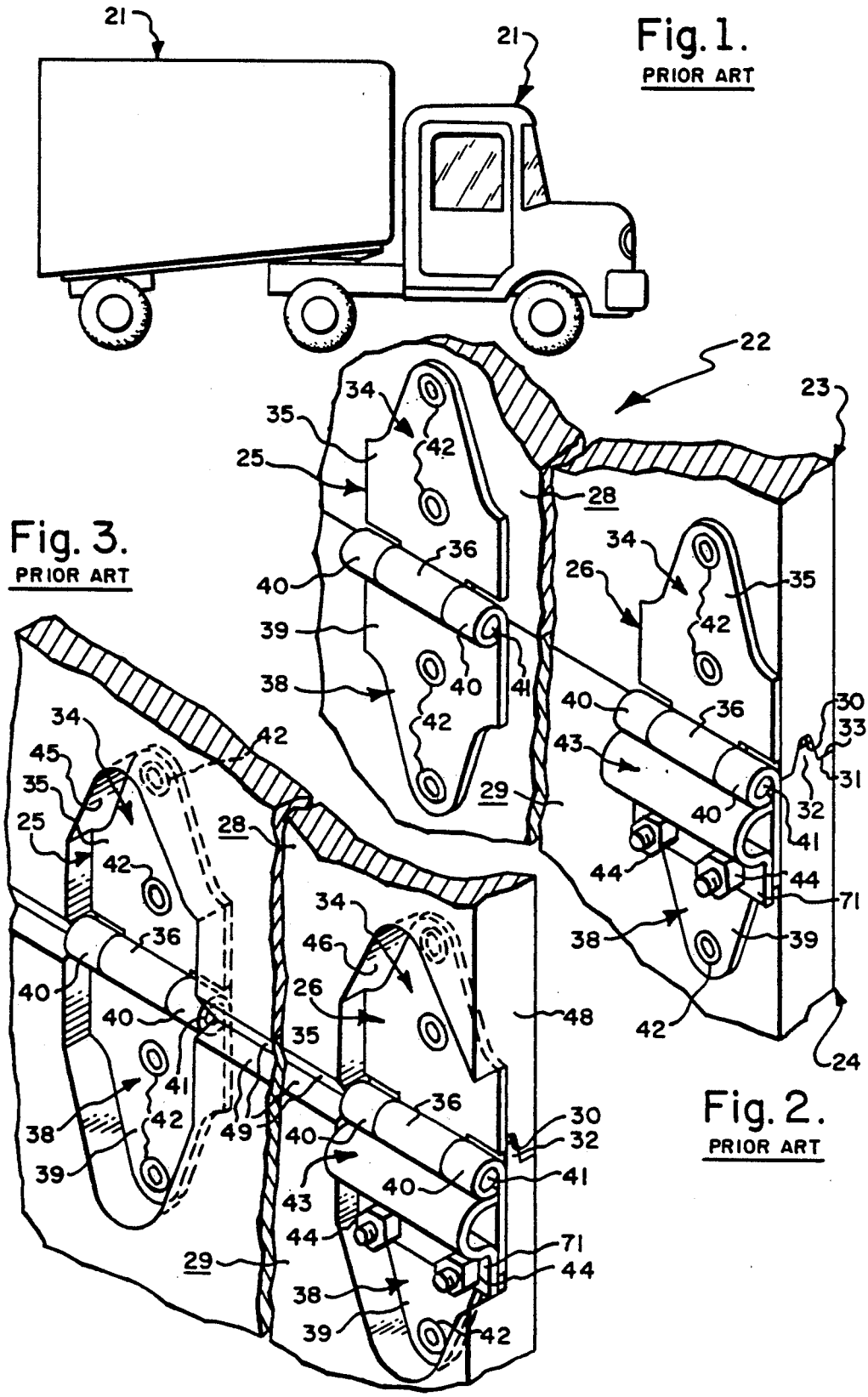

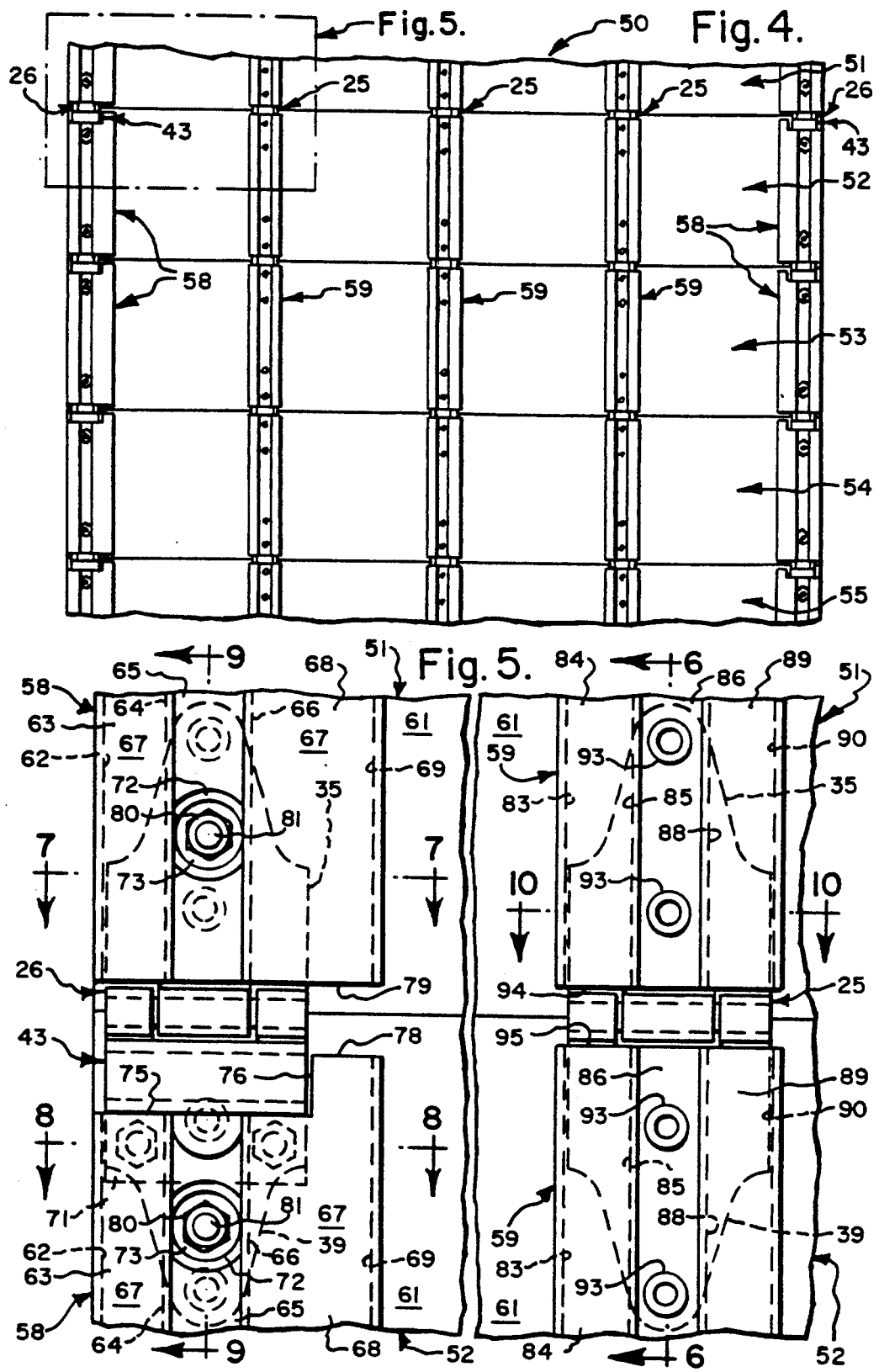

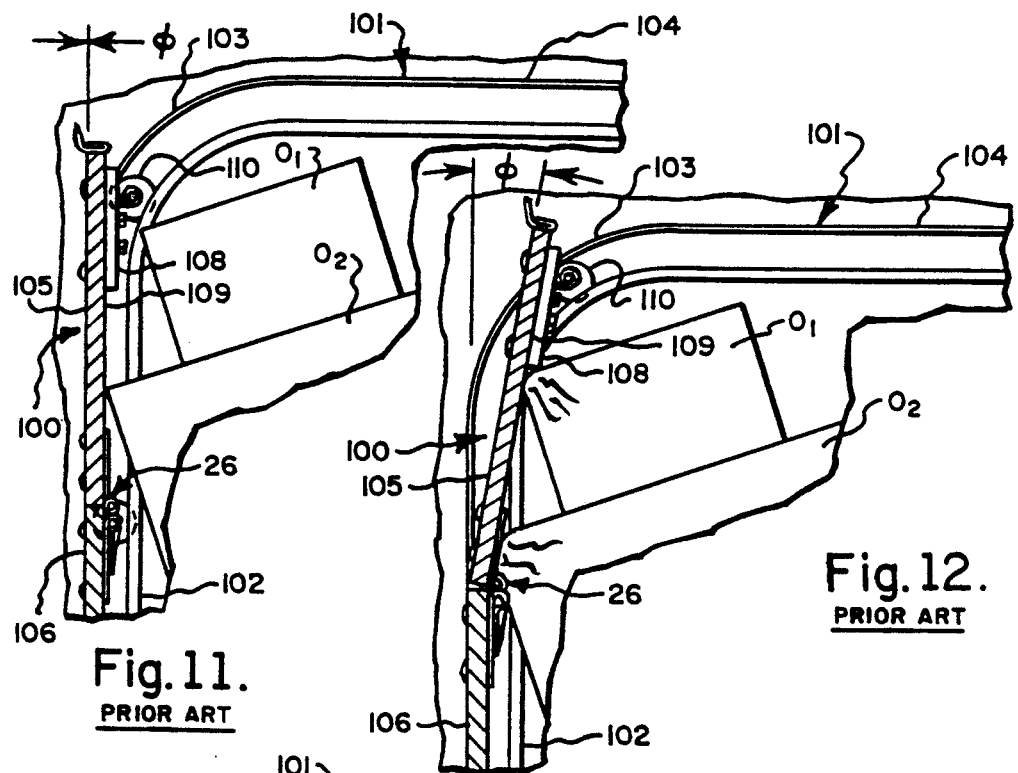
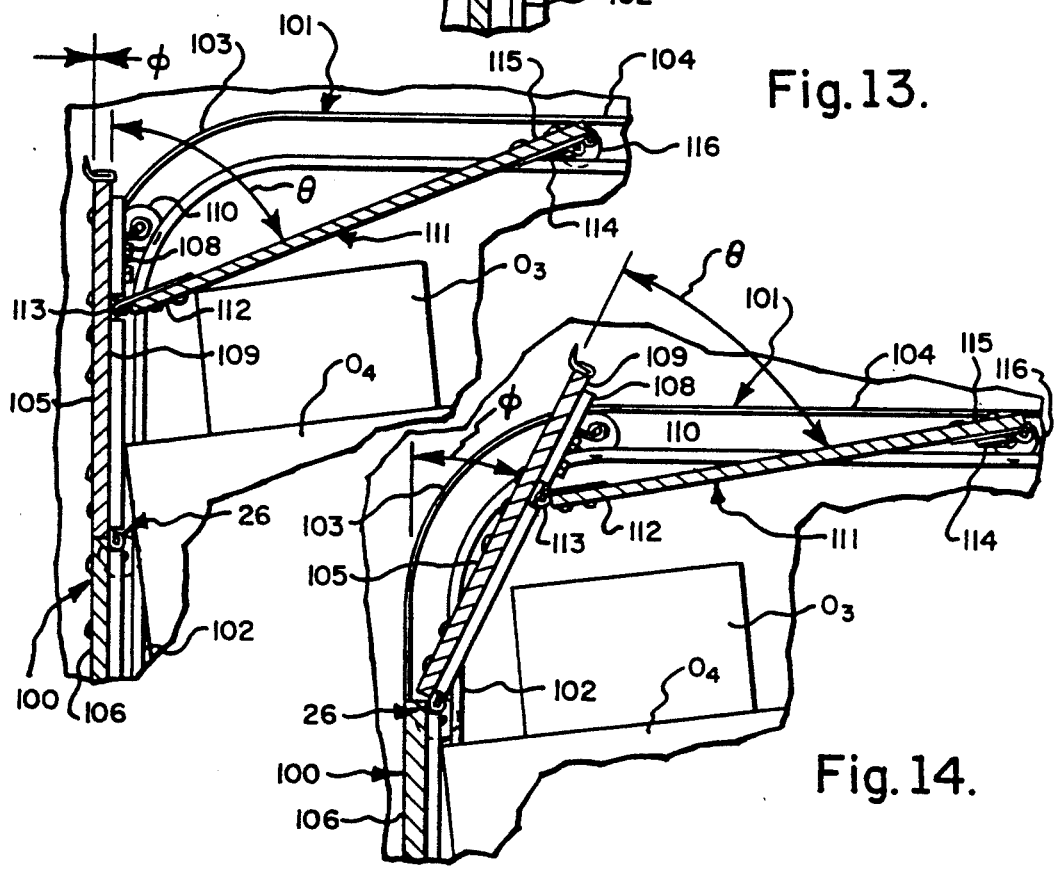

GUARD MEMBERS FOR PREVENTING SHIFTING CARGO FROM INTEFERING WITH THE OPERATION OF A ROLL-UP DOOR

TECHNICAL FIELD

The present invention relates generally to the field of roll-up or upwardly-acting doors commonly found on trucks, trailers and the like, and, more particularly, to an improved roll-up door having certain guards to prevent shifting cargo from interfering with the normal operation of the door.

BACKGROUND ART

Upwardly-acting or roll-up doors are commonly used in trucks, trailers and the like, to selectively close a cargo access opening. These doors generally have a pair of inverted L-shaped tracks, one on either side of the opening. The doors typically have a number (e.g., usually from five to eight) of horizontally-elongated rectangular panels which are series-connected to one another. Thus, the door may be selectively moved between a lowered position in which the panels are vertically-disposed, and a raised position in which the panels are horizontally-disposed in an overhead position.

While this type of door is in common use, a problem persists with respect to cargo shifting against the door and interfering with attempts to raise the same. If not adequately secured, the cargo will normally vibrate and move around during normal over-the-road travel of the vehicle. The problem is accentuated in "wedge"-shaped trailers where the floor is sloped rearwardly toward the cargo opening because the cargo will tend to move toward the door. However, the problem is not limited to vibrational movement, or to "wedge"-shaped trailers. For example, if a backing truck bumps the cargo dock, the inertia of the moving cargo may shift it rearwardly toward the door.

In some instances, shifting cargo becomes interlocked with the door, and hinders or prevents the door from being raised. The principal reason for this is the fact that such door typically has a stepped surface in the vicinity of the hinges. Whether the hinges are mounted on the surface of the door panels and extend into the cargo compartment, or the hinges are recessed in the door, such doors as have been developed heretofore have typically provided an opportunity for shifting cargo to become interlocked therewith.

In addition to this, the several door panels must pass through a space as they are translated from their lowered position to their raised position, and *vice versa*. For example, when the door is being raised and a panel is arranged at a 45° angle, it forms the hypotenuse of a triangle having equal horizontal and vertical sides. If cargo has shifted into the space through which the panel must pass, operation of the door can be impaired or even prevented. Accordingly, it would be generally desirable to reduce the opportunity for shifting cargo to bear against, and become interlocked with, the lowered door, and to prevent such cargo from entering the space through which the panels must pass as the door is raised.

DISCLOSURE OF THE INVENTION

The present invention provides improved guards for an upwardly-acting or roll-up door. The improved guards are designed and intended to prevent shifting cargo, or other moving objects, from interfering with the normal opening and closing of the door.

With parenthetical reference to the corresponding parts, portions or surfaces of the disclosed embodiment for the purposes of illustration, the roll-up door (e.g., 20) has a horizontally-elongated first panel (e.g., 24) mounted on a track (e.g., 101) for guided articulated movement relative to an opening between a lowered position (e.g., as shown in the accompanying drawings) and a raised overhead out-of-the-way position. The panel has a planar inner surface (e.g., 61) facing into a protected area, such as the body of a truck or trailer, or into an enclosed space in the case of a static structure. The door also has a hinge section (e.g., 38) mounted on the panel and facing into the protected area. The hinge section has a plate-like leaf portion (e.g., 39) mounted on the panel, and has a knuckle portion (e.g., 36,40) extending away from the leaf portion into the protected area.

In one aspect, the invention provides an elongated guard (e.g., 58 or 59) mounted on the panel and having a planar first surface (e.g., the inwardly-facing surfaces or portions 63,68 or 84,89) arranged substantially parallel to the panel inner surface and facing into the protected area. The guard extends substantially the full vertical height of the panel, and has a first marginal end portion (e.g., 98 or 99) overlapping the leaf portion and having an end face arranged in closely-spaced facing engagement to the knuckle portion. The transverse cross-sectional shape of the guard substantially conceals the hinge section. Hence, the guard and knuckle portion present a substantially-smooth non-stepped surface facing into the protected area such that even if an object within the protected area bears against the panel, the panel may still be moved from its lowered position to its raised position.

In another aspect, the door has a multiplicity of panels (e.g., 105, 106, etc.). Each panel is pivotally connected to at least one adjacent panel so that the panels are series-connected. Each panel has an inner surface (e.g., 109) arranged to face into the protected area when the door is lowered. When the door is in its lowered position, the several panels will be vertically disposed, one above another, to close the opening. When the door is raised, the panels will be horizontally disposed in an overhead out-of-the-way position.

In this form, the improved guard (e.g., 111) has a first marginal end portion (e.g., 112) pivotally connected to one of the panels (e.g., 105) and has a second marginal end portion (e.g., 115) mounted for horizontal movement relative to the opening. The guard is so positioned and arranged, when the door is in its lowered position, that an object within the protected area cannot readily enter the space through which the panels will move when the door is moved from its lowered position to its raised position.

Accordingly, the general object of the invention is to provide an improved guard for reducing the opportunity for shifting cargo or other objects from interfering with the normal operation of a roll-up door.

Another object is to provide an improved guard for a roll-up door which protectively encloses the major portions of the various hinges by which the panels are pivotally connected, which presents a generally-smooth non-stepped surface facing into the protected environment, and which therefore affords a reduced opportunity for shifting cargo or other objects to become interlocked with the door.

Still another object is to provide an improved guard for a roll-up door, which guard effectively prevents cargo or other objects from becoming positioned in the space through which the several panels of the door must pass when the door is moved from its lowered position to its raised position.

These and other objects and advantages will become apparent from the foregoing and ongoing written specification, the drawings and the appended claims.

BRIEF DESCRIPTION OF THE DRAWINGS

FIG. 1 is a schematic side elevation of a tractor and trailer, this view exaggerating the downward and rearward slope of the floor of a "wedge"-shaped trailer.

FIG. 2 is a perspective inside view of a fragmentary portion of a prior art roll-up door, this view showing two surface-mounted hinges as being mounted on adjacent panels, the leftward hinge being at an intermediate position and the rightward hinge being mounted adjacent to the right marginal end faces of the adjacent panels and carrying a roller-supporting member thereon, this view also showing a prior art tongue-and-groove joint between the adjacent horizontally-extending upper and lower ends of the panels.

FIG. 3 is a perspective inside view of two prior art recessed hinges mounted on adjacent panels, the leftward hinge being at an intermediate position on the door and the rightward hinge being mounted adjacent the right end faces of the panels, the rightward hinge being shown as again carrying a roller-supporting member thereon, this view also illustrating the manner by which such hinge-receiving recesses extend into and weaken the tongue-and-groove joint between the panels.

FIG. 4 is a fragmentary elevational view looking at the inside surface of a lowered roll-up door incorporating the improved first guards from within the protected area.

FIG. 5 is an enlarged detail view of the inside of such door, this view encompassing the structure within the indicated box in FIG. 4.

FIG. 11 is a fragmentary vertical sectional view of a prior art upwardly-acting door, showing a pair of box-like objects as being arranged in the space through which the panels must pass when the door is moved from its lowered position to its raised position.

FIG. 12 is a view similar to FIG. 11, and showing the upper panel of the door as moving toward and crushing the objects when the door is attempted to be raised.

FIG. 13 is a fragmentary vertical sectional view of an upwardly-acting door incorporating the improved guard panel, this view showing the door as being in its lowered position with the box-like objects physically engaging the upper and guard panels.

FIG. 14 is a view similar to FIG. 13, and showing the guard panel as moving upwardly away from the uppermost object, with the several door panels free to move through the space previously protected by the guard panel, when the door is raised.

MODE(S) OF CARRYING OUT THE INVENTION

Figure 6:
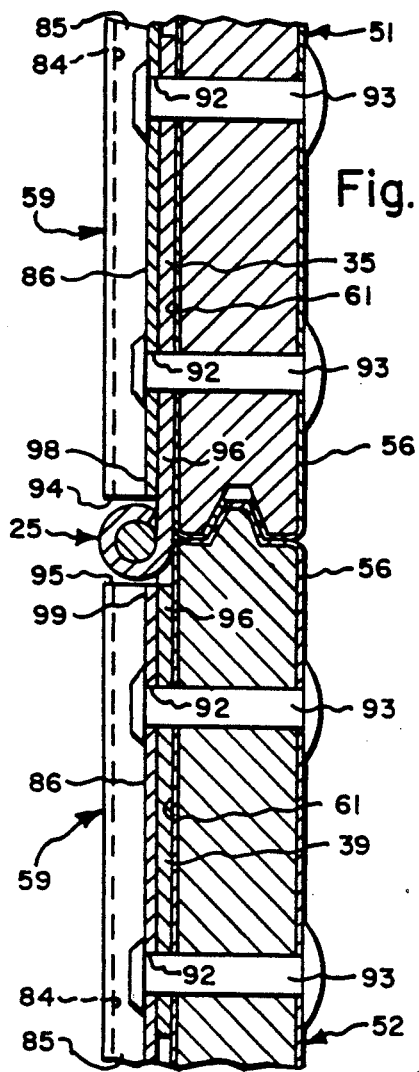
FIG. 6 is a fragmentary longitudinal vertical sectional view of the in-board or intermediate hinge, taken generally on line 6—6 of FIG. 5.

At the outset, it should be clearly understood that like references numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, proportion, degree, etc.) together with the specification and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to is axis of elongation, or axis of rotation, as appropriate.

This invention broadly provides unique guards for use in an upwardly-acting or roll-up door, such as commonly employed to close the rear cargo opening in trucks, trailers and the like. However, it should be clearly understood that the improved guards are not limited to use with such vehicle-mounted doors. Indeed, such guards could also be used in upwardly-acting doors used to close openings in static structures (e.g., domestic garage doors, industrial doors, and the like) as well. Hence, as used herein, the terms "roll-up door" and "upwardly-acting door", are generally synonymous, and are intended to cover any of such doors, regardless of the particular structure on which they are mounted.

Persons skilled in this art will readily appreciate that such doors typically include a number (e.g., usually from five to eight) series-connected horizontally-elongated rectangular panels which are mounted for guided articulated movement between a lowered position in which such panels are vertically-disposed, and a raised overhead out-of-the-way position in which such panels are horizontally-disposed. Thus, the door may be selectively raised to permit access to a protected area (e.g., the cargo body of a truck or trailer, or the interior of a garage or some other building, etc.), or selectively lowered to close the opening and to prevent access, either by people, weather, contaminants or the like, to the protected area.

Before proceeding to a discussion of the improved guards, it is deemed desirable to first review the structure and operation of a basic prior art door, a persistent problem facing the trucking industry, and a second prior art door which attempted to solve this problem. It is felt that the present improvements may be best understood in the context of the problem and the attempted prior art solution. Thus, a first prior art door is shown in FIG. 2; a supposedly-improved prior art door is shown in FIG. 3; and the improved door, incorporating the guards of the present invention, is shown in FIGS. 4–14. These various forms will be discussed seriatim herebelow.

THE PROBLEM

Simply stated, the particular problem to be solved is that of cargo or other objects shifting so as to bear against the inside surface of a closed truck door, or otherwise moving to a position at which it interferes with the normal operation (i.e., opening and closing) of the door.

Referring first to FIG. 1, a tractor 20 and semi-trailer 21 are schematically depicted. This particular trailer is "wedge"-shaped, so named because its floor slopes downwardly and rearwardly toward the rear cargo opening (not shown in FIG. 1) of the vehicle. This particular shape is desirable because it affords a high interior cargo volume. However, unless the cargo is securely tied down or otherwise restrained, vibrations normally experienced in over-the-road travel will cause the cargo to vibrate and "dance" toward the rear cargo opening. Such shifting cargo may bear against the inside surface of a roll-up door closing the opening, and, depending upon its shape, weight and the nature of its contact with the door, may interfere with the normal operation of the door.

This problem is not limited to such "wedge"-shaped trailers, but is common to other types of trucks and trailers as well. For example, if a backing truck bumps a cargo dock, the load may move inertially rearwardly. Thus, whatever its cause, the particular problem to be solved is that of cargo bearing against, or otherwise interfering with, the normal intended operation of the door. In certain instances, such shifting cargo has prevented the door from being manually lifted. In some cases, the operators have attempted to lift a jammed door with the forks of a lift truck. In an extreme instance, the sheer lifting force of the lift truck has actually caused the door to separate from its track and to penetrate the roof of the vehicle. Thus, the particular problem at hand is that of preventing the cargo or other objects from interfering with the normal operation of a roll-up door.

FIRST PRIOR ART DOOR (FIG. 2)

Referring now to FIG. 2, a fragmentary portion of a roll-up door, generally indicated at 22, is shown as including upper and lower horizontally-elongated rectangular panels 23, 24, respectively, which are shown as being pivotally connected to one another by left and right hinges 25, 26, respectively. Panels 23, 24 are shown as being vertically-disposed, and as having planar vertical inner surfaces 28, 29, respectively, facing into the cargo compartment. A horizontally-extending truncated inverted V-shaped groove 30 extends upwardly into panel 23 from its lower planar horizontal end face 31. Conversely, a complimentarily-configured horizontally-elongated inverted truncated V-shaped tongue 32 extends upwardly from the lower panel upper end face 33. When the door is in its lowered position, in which panels 23, 24 are vertically disposed (i.e., as shown in FIG. 2), tongue 32 is received in groove 30.

Thus, the tongue-and-groove joint provides a tortuous path for entry of weather (i.e., rain, snow, ice, etc.) or other contaminants into the cargo compartment.

Hinges 25, 26 are basically the same, except that hinge 26, which is positioned adjacent the right vertical end face of the door, also supports a bolt-on member for supporting a roller (not shown). This basic type of hinge is representatively shown and described in U.S. Pat. No. 3,416,589, the aggregate disclosure of which is hereby incorporated by reference. Thus, each hinge includes an upper section 34 having a platelike leaf portion 35 and integrally-formed knuckle portions 36, and a lower section 38 having a plate-like leaf portion 39 and an integrally-formed knuckle portion adapted to fit interdigitally with knuckle portion 36. A pin 41 is passes through the two knuckle portions to mount the two adjacent panels for pivotal movement relavtive to one another. Each hinge section is held against the inner surface of the associated panel by means of a plurality of fasteners, severally indicated at 42. While these are shown as being rivets, in some cases, bolt-type fasteners may be alternately used. As previously noted, a hook-shaped roller-supporting member 43 is bolted onto the rightward hinge to provide a tubular sleeve which is adapted to receive the shaft of a roller assembly (not shown). The fasteners 44, by which member 43 is secured to the lower hinge section 38, are shown as having exposed threaded marginal end portions with nuts tightened thereon. Additional details as to the structure and operation of this known hinge may be found in said U.S. Pat. No. 3,416,589.

While this hinge provides an acceptable means for pivotally joining the adjacent panels together, it should be noted that the hinge sections are mounted on the interior surfaces of the panels, and that the knuckle portions, the fasteners and the supporting member all extend into the cargo compartment. Hence, these portions provide step-like surfaces that can become engaged with shifted cargo. Thus, such shifted cargo can become interlocked with the hinge structure to prevent, or at least interfere with, normal operation of the door.

SECOND PRIOR ART DOOR (FIG. 3)

In an attempt to solve this problem, it has been proposed to recess the hinges into the panels, as shown in FIG. 3.

The structure of hinges 25, 26 is substantially the same as that previously described. The salient difference is that portions of the panels were routed-out to provide recesses for the hinges. Thus, in FIG. 3, leftward hinge 25 is received in a recess 45, while rightward hinge 26 is received in a recess 46. These two recesses are shaped to generally compliment the shapes of the various hinge sections. However, right recess 46 opens onto the planar vertical right end face 48 of the door in order that the right end of the tubular roller-supporting member 43 would be exposed to receive the roller shaft (not shown). It should also be noted that recesses 45, 46 interfere with longitudinally-extending tongue-and-groove portions 32,30. More particularly, the transverse dimensions of the tongue and groove are narrowed by the depth of each recess, with such structural weakening affording improved opportunity for breakage of, or damage to, the tongue-and-groove joint. In addition to this, it was necessary to provide beveled edges, severally indicated at 49, to permit adjacent panels to pivot relative to one another when the hinge sections were recessed. Moreover, even though the intent was to generally recess the hinges within the associated panels, such arrangement still provided a stepped configuration which could still be engaged by shifting cargo. For example, the corner of a shifted box (not shown) could enter the recess and still become engaged with the hinges. Thus, such recessed hinges actually weakened the structural integrity of the tongue-and-groove joint between the panels, required that additional beveled surfaces 49, 49 be provided, and still afforded a stepped configuration, albeit perhaps less pronounced, which could be engaged by shifting cargo.

FIRST FORM OF THE IMPROVED GUARD (FIGS. 4–10)

Referring now to FIGS. 4–10, the first aspect of the invention provides an improved hinge guard which is designed to protectively enclose and substantially conceal the surface-mounted hinges of the first prior art embodiment so as to strengthen those hinges and reduce the opportunity for shifting cargo to become interlocked with the door.

FIG. 4 is an inside elevational view from within the protected area of an intermediate portion of a roll-up truck door, generally indicated at 50, incorporating two forms of the improved hinge guard. In FIG. 4, the door is shown as including, in pertinent part, five horizontally-elongated rectangular panels 51,52,53,54,55, respectively. These panels are series-connected in the sense that at least one longitudinally-extending marginal end portion of each panel is pivotally connected to the similar marginal end portion of an adjacent neighboring panel, by a plurality of hinges 25,26, previously described. In the particular embodiment shown, the various hinges are arranged in vertically-aligned columns, with the left and right out-board hinges having roller-supporting members thereon, and the hinges of the three intermediate columns being like interior hinges 25. The particular number of such intermediate columns is not critical.

It should be clearly understood that such hinges are individually "old", and are therefore not claimed per se. Moreover, as clearly shown in FIGS. 6 and 9, the hinges are surface-mounted, and that a tongue-and-groove joint is provided between the panel sections. The panels of the improved door are shown as being wrapped with a metal skin, indicated at 56, in FIGS. 6–10. However, this feature is also per se "old", and is representatively shown and described in U.S. Pat. Nos. 3,518,792, 3,866,686 and 4,403,452, the aggregate disclosure of each of which is also hereby incorporated by reference. In any event, the surface-mounted hinges of the improved door will be described as being the same as those previously described.

Two functionally similar, but structurally different, types of hinge guard are employed in the improved door. The first hinge guards, generally indicated at 58, are adapted to protectively enclose the out-board hinges 26, while the second guards, generally indicated at 59, are adapted to protectively enclose the in-board or intermediate hinges 25.

Figure 7:
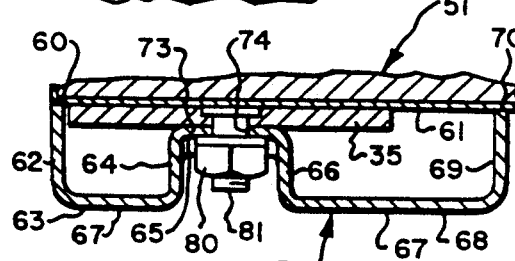
FIG. 7 is a fragmentary transverse horizontal sectional view of the out-board hinge, taken generally on line 7—7 of FIG. 5, and showing a portion of the fastener employed to hold the guard to the door as being arranged within the guard recess.
Figure 8:
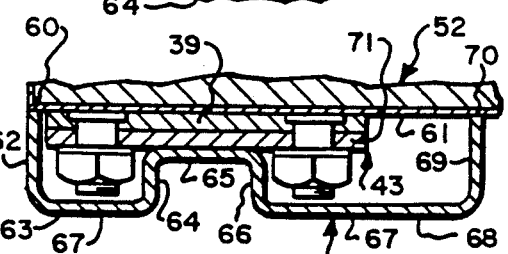
FIG. 8 is a fragmentary transverse horizontal sectional view of the out-board hinge, taken generally on line 8—8 of FIG. 5, showing the guard as enclosing the lower hinge section leaf portion, the plate portion of the roller-supporting member mounted thereon, and the fasteners therebetween.

Referring now to FIGS. 4,5 and 7–9, the out-board guard 58 is shown as being a vertically-elongated metal member having a somewhat W-shaped transverse cross-section (FIGS. 7-8). Guard 58 may be bent, rolled or otherwise formed, from suitable sheet stock into the particular configuration shown. As best shown in FIG. 7, the guard sequentially includes: a planar vertical left end face 60 adapted to engage the inner surface 61 of the associated panel, a portion 62 extending normally (i.e., perpendicularly) away from the panel, a portion 63 extending rightwardly therefrom and arranged substantially parallel to panel inner surface 61, an in-turned portion 64 extending normally toward the panel, a portion 65 extending rightwardly therefrom and arranged generally parallel to panel surface 61, an out-turned portion 66 extending normally away from the panel, a portion 68 extending rightwardly therefrom and having a planar vertical surface substantially coplanar with the planar vertical surface of portion 63, and an in-turned portion 69 extending normally toward the panel and terminating in a right end face 70 engaging panel inner surface 61. Thus, guard portions 62,64,66,69 are parallel to one another and are perpendicular to panel surface 61, whereas portions 63,65,68 are generally parallel to one another and parallel to panel surface 61. Portions 63,68 have coplanar surfaces, collectively indicated at 67, facing into the cargo compartment. In the preferred embodiment, guard 58 is formed integrally of 16 gauge steel (i.e., having a thickness of about 0.060 inches [1.52 mm]), but could be formed of some other material if desired. End faces 60,70 are arranged to engage the panel inner surface 61 for substantially the full length of the guard.

Figure 9:
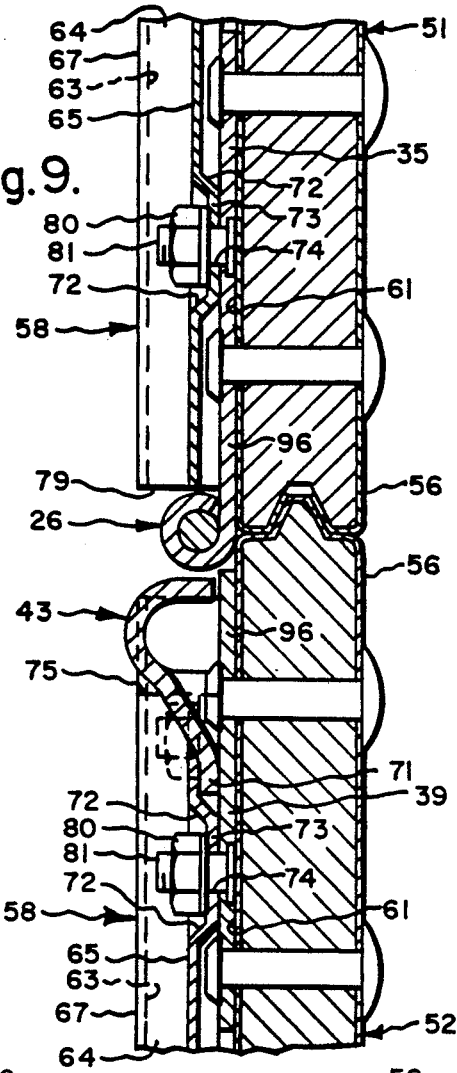
FIG. 9 is a fragmentary longitudinal vertical sectional view of the out-board hinge, taken generally on line 9—9 of FIG. 5.

Portions 64,65,66 form a vertically-elongated recess, having a generally U-shaped transverse cross-section, facing into the cargo compartment and extending the full length of the guard. As best shown in FIGS. 8 and 9, guard portion 65 is spaced from panel inner surface 61 and the facing planar surfaces of hinge leaves 35,39. However, guard portion 65 is adapted to engage the plate-like portion 71 of roller-supporting member 43. However, portions of guard portion 65 about mounting holes spaced therealong, are struck further inwardly toward the panel. These portions are shown as being severally bounded by generally frusto-conical portions 72 and annular portions 73 immediately surrounding the mounting holes, severally indicated at 74 (FIG. 9). Annular portions 73 are adapted to engage hinge leaves 35,39. Thus, guard portion 65 is adapted to engage member plate portion 71, while the annular portions 72 about the mounting holes are adapted to engage the plate-like hinge section leaves 35,39, as shown in FIGS. 8 and 9.

As best shown in FIGS. 4, 5 and 9, one of guards 58 is mounted on each of the left and right marginal end portions of each panel so as to protectively enclose the left and right hinge sections mounted thereon. Thus, the upper marginal end portion of guard 58 is arranged to overlap and engage one of lower hinge leaves 39. As best shown in FIG. 5, the upper end of the left guard is notched to accommodate the roller-supporting member. More particularly, the upper end of guard 58 includes a transversely-extending horizontal surface 75 exposing portions 62,63,64,65,66 and part of 68, a leftwardly-facing longitudinally-extending vertical surface 76 exposing portion 68, and a transversely-extending horizontal surface 78 exposing the balance of guard portion 68 and portion 69. Guard end surfaces 75,76 are arranged in closely-spaced facing engagement to the cylindrical side wall and right end face of roller-supporting member 43. Guard end face surface 78 extends upwardly beyond surface 75, and is arranged in spaced facing relation to the projected extension of the cylindrical surfaces of knuckle 36,40. The lower marginal end portion of guard 58 is arranged to overlap and engage one of upper hinge leaves 35, and has its transversely-extending lower end face 79 arranged in closely-spaced facing relation to hinge knuckle 36,40. The upper and lower marginal end portions of each guard 58 may be secured to the associated panel by means of nuts 80 threaded onto bolt-like fasteners 81 fixed to the associated hinge plates and penetrating holes 75. This feature allows the guard to be removed from the door for repair or replacement of roller-supporting member 43 or the roller (not shown). The right guard is substantially identical to left guard 58, except that the notched upper end is configured as a mirror image of the left guard.

Figure 10:
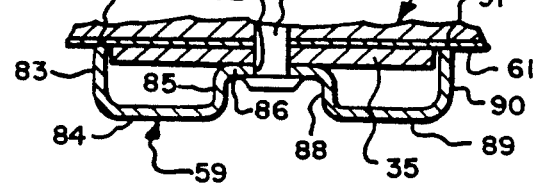
FIG. 10 is a fragmentary vertical sectional view thereof, taken generally on line 10—10 of FIG. 5, showing the guard as engaging the leaf portion of the in-board hinge section.

Referring now to FIGS. 4–6 and 10, each intermediate or in-board guard 59 is also shown as being a vertically-elongated metal member, again having a somewhat W-shaped transverse cross-section (FIG. 10). Guards 59 may also be bent or rolled of suitable sheet stock, such as 16 gauge steel or equivalent. As best shown in FIG. 10, each inner guard sequentially includes: a planar vertical left end face 82 arranged to engage the inner surface 61 of the associated panel, a portion 83 extending normally away from panel surface 61, a portion 84 extending rightwardly therefrom and arranged substantially parallel to panel surface 61, an in-turned portion 85 extending normally toward panel surface 61, a portion 86 extending rightwardly therefrom and arranged substantially parallel to panel surface 61, an out-turned portion 88 extending normally away from the panel, a portion 89 extending rightwardly therefrom and arranged generally parallel to panel surface 61, and an in-turned portion 90 extending toward the panel and terminating in a planar vertical right end face 91 engaging panel surface 61. Thus, guard portions 83, 84,86,88 are arranged generally parallel to this panel surface. As best shown in FIG. 10, guard portion 86 is arranged to bear against hinge leaf 35. Moreover, guard portion 86 is provided with a plurality of horizontal through-holes, severally indicated at 92, to accommodate passage of a like number of rivet-like fasteners 93 by which the guard and hinge section may be secured to the panel. Guard end faces 82,91 are arranged to engage panel surface 61 for substantially the full length of the guard. As with guard 58, portions 85,86,88 form a vertically-elongated recess, having a generally U-shaped transverse cross-section, which faces into the cargo compartment and extends the full length of the guard. As best shown in FIG. 6, each guard has a transverse horizontal lower end face 94 arranged in closely-spaced facing relation to the proximate lower hinge knuckle 36,40, and has a transverse horizontal upper end face 95 arranged in closely-spaced facing engagement to the proximate upper hinge knuckle. Thus, the upper and lower marginal end portions of the intermediate guards are secured to the panel by means of fasteners 93. Alternatively, such guards could be secured to the panel by bolt-like fasteners, as with guard 58.

Therefore, this first aspect of the invention provides an improved hinge guard (e.g., 58 or 59) for a roll-up door. The guard is mounted on a door panel and has a coplanar first surface (e.g., 67) arranged substantially parallel to the panel inner surface and facing into the protected cargo-containing area. The guard extends substantially the full height of the panel and has a first marginal end portion (e.g., 98 or 99) overlapping a hinge leaf (e.g., 35 or 39) and terminates in an end face (e.g. 78, 79, 94 or 95) arranged in closely-spaced facing relation to the proximate hinge knuckle (e.g., 36, 40). Thus, the guard and knuckle portion present a relatively substantially-smooth generally non-stepped surface (i.e., as compared with the prior art embodiments) which faces into the protected area so that an object within the protected area which bears against the panel will have a reduced opportunity to become interlocked with the door, such that the panel may still be manually moved from its lowered position to its raised position.

At the same time, the improved guard (e.g., 59) also serves to strengthen the hinge and door. In this regard, it will be recalled that each hinge section (e.g., 34,38) typically includes a plate-like leaf portion (e.g., 35,39) with an integrally-formed knuckle portion (e.g., 36,40). The various hinge portions are secured to the associated panel by various fasteners (e.g., 93) passed through mounting holes provided through the leaf portion. Thus, as clearly shown in FIGS. 6 and 9, the knuckle portion and part of the leaf portion between the knuckle portion and the closest fastener, is mounted as a cantilever extending away from the remainder of the plate portion. This cantilevered portion is generally indicated at 96. Thus, if a shifting object bears against the door, this cantilevered portion is urged to flex or bend away from the panel. Moreover, the hinges are typically regarded as the weakest point in the door.

The improved hinge guard (e.g., 59) functions to strengthen the associated hinge by providing marginal portions which engage, and effectively reduce the length of, the cantilevered portion. For example, in FIG. 6, the upper guard 59 is shown as having a lower marginal end portion 98 which engages hinge section 34 between lowermost fastener 93 and knuckle portion 36. Similarly, the lower guard 59 has an upper marginal end portion 99 which engages hinges section 38 between uppermost fastener 93 and knuckle portions 40,40. These upper and lower marginal end portions include portions 64,65,66 defining the U-shaped recess. Since portions 64,65 are arranged perpendicular to plate portion 35, they act as webs between flange portions 63,65, 68. Thus, the guard is configured to reinforce the cantilevered hinge section portions, thereby strengthening the hinge and door.

SECOND FORM OF THE IMPROVED GUARD (FIGS. 11-14)

The present invention also provides, in a second aspect, an improved guard which is adapted to prevent cargo or other objects from shifting into the space through which the panels must move as the door is articulated between its raised and lowered positions.

Referring now to FIG. 11, a fragmentary portion of a vehicle-mounted rollup door, generally indicated at 100, is shown as including a plurality of of panels mounted for guided articulated movement along an inverted L-shaped track. Persons skilled in this art will readily appreciate that two of such tracks are typically provided, one on either side of the opening with which the door is associated. However, in FIG. 11, only one such track, generally indicated at 101, is shown. This track is depicted as having a leftward vertical section 102, and intermediate arcuate section 103, and an overhead horizontal section 104 extending rightwardly therefrom.

The door itself has a number of horizontally-elongated rectangular panels. However, in FIG. 11, only the uppermost panel 105 and next-lower panel 106 appear. A bracket 108, secured to the upper marginal end portion of upper panel inside surface 109, carries a freely-rotatable roller 110 which is operatively captured within track 101 for guided movement therealong. Persons skilled in this art will readily appreciate that a similar roller (not shown), albeit arranged as a mirror image, is arranged on the other side of the door (not shown). Panels 105,106 are pivotally connected by a row of horizontallyshaped hinges, one of which is generally indicated at 26.

In FIG. 11, a pair of box-like objects, $O_1$ and $O_2$, are shown as having been shifted against the closed door. Hence, when the door is raised, the upper panel 105 moves toward the objects, as shown in FIG. 12. The reason for this is that the upper panel forms the hypotenuse of an imaginary right triangle. The angle between the vertical and the planar outer surface of the upper panel is indicated as being angle $\phi$. Hence, as the door is raised, the horizontal distance of this triangle increases, and the vertical distance thereof decreases. Nevertheless, as shown in FIG. 12, the various panels move toward such shifted cargo when the door is raised.

A roll-up door incorporating the improved space-protecting guard, is shown in FIGS. 13-14. Hence, the door is basically the same as that heretofore described in FIGS. 11 and 12. The salient difference is that the improved door is provided with guard panel, generally indicated at 111. The left marginal end portion 112 of guard panel 111 is pivotally connected, as indicated by knuckle portions 113, to an intermediate portion of the upper panel inner surface 109. A roller-supporting member 114, similar to bracket 108, is secured to the upper marginal end portion 115 of the guard panel inner surface. Member 114 carries a roller 116 which is captured within track portion 104 for horizontal movement therealong. The guard panel, which may be imperforate, is so configured and arranged that when the door is in its closed position (as shown in FIG. 13), the guard and upper panels are arranged at an acute included angle ($\theta$) of about 65°, with roller 116 being arranged in the horizontal portion 104 of the track. FIG. 13 also depicts a pair of box-like objects, $O_3$, and $O_4$, as having shifted against the guard and upper panels, respectively. The function of guard panel 111 is to prevent such objects from readily entering the space through which the panels must pass as the door is raised. Hence, as comparatively shown in Gigs. 13 and 14, when the door is raised, the guard panel moves away from an object ($O_3$) initially bearing thereagainst, this being reflected in FIG. 14 by the fact that as the angle ($\phi$) between the upper panel and the vertical increases, the angle ($\theta$) between the upper and guard panels decreases. In FIG. 14, $\phi \approx 20°$ and $\theta \approx 55°$.

Thus, in this form, the improved guard (e.g., 111) has a first marginal end portion (e.g., 112) pivotally connected (e.g., as indicated at 113) to one of the panels (e.g., upper panel 105) and has a second marginal end portion (e.g., 115) pivotally mounted (e.g., via roller 116) for horizontal movement relative to the cargo opening. The guard is so positioned and arranged, when the door is in its lowered position, that an object within the protected area cannot readily enter the space through which the panels must move, pass and articulate, when the door is moved from its lowered position to its raised position.

MODIFICATIONS

The present invention contemplates that many changes and modifications may be made.

For example, the cross-sectional shape and configuration of the hinge guards is not deemed critical, and may be varied. The material of construction, as well as the manner of its formation, is not deemed critical. Similarly, the type and nature of the hinges, and the type and nature of the fasteners by which the guards and/or hinge leaves are secured to the door, is not deemed critical. Whether the door is metal-skinned or not, is unimportant. Whether a tongue-and-groove joint is provided between the adjacent panels is also unimportant.

With respect to the space-protecting guard, the guard panel may be configured similarly to the other door panels, if desired. It may be perforate or imperforate, as desired. The particular means by which it is mounted to the door, and supported for movement horizontally (e.g.,horizontal movement along the horizontal portion of the track) is not deemed critical. The salient of the space-protecting guard is that it prevents cargo or other objects from entering the space through which the panels must pass, when the door is raised. At the same time, the guard moves away from any shifted object bearing thereagainst, when the door is raised.

Therefore, while presently-preferred forms of the improved guards have been shown and described, and several modifications and changes thereof discussed, persons skilled in this art will readily appreciate that various additional changes and modifications may be made without departing from the spirit of the invention, as defined and differentiated by the following claims.

What is claimed is:

1. In a roll-up door having a rectangular first panel mounted for guided articulated movement relative to an opening between a lowered position partially closing said opening and a raised overhead out-of-the-way position, said panel having a planar inner surface facing into a protected area, and having a hinge section mounted on said panel and facing into said protected area, said hinge section having a leaf portion mounted on said panel and having a knuckle portion extending from said leaf portion into said protected area, the improvement which comprises:

an elongated guard mounted on said panel and having a planar first surface arranged substantially parallel to said panel inner surface and facing into said protected area, said guard extending substantially the full height of said panel and having a first marginal end portion overlapping said leaf portion and having an end closely spaced to said knuckle portion, the transverse cross-sectional shape of said guard substantially concealing said hinge section;

whereby said guard and knuckle portion will present a substantially smooth non-stepped surface facing into said protected area such that if an object within said protected area bears against said panel, said panel may be moved from said lowered position to said raised position.

2. The improvement as set forth in claim 1 wherein said guard has a second surface arranged to engage said leaf portion.

3. The improvement as set forth in claim 1 wherein said guard has a third surface arranged to engage said panel inner surface.

4. The improvement as set forth in claim 1 wherein said guard has a fourth surface arranged to engage said panel inner surface.

5. The improvement as set forth in claim 1 wherein said leaf portion is mounted on said panel inner surface by a plurality of first fasteners, wherein each first fastener has a head portion facing into said protected area, and wherein each first fastener head portion is protectively enclosed within said guard.

6. The improvement as set forth in claim 5 wherein said knuckle portion extends away from said leaf portion as a cantilever, and wherein said guard has a second surface arranged to engage said leaf section between said first fastener and said knuckle portion to reduce the length of said cantilever.

7. The improvement as set forth in claim 5 wherein said guard is provided with a longitudinally-extending recess, wherein said guard is mounted on said panel by a second fastener, and wherein said second fastener has a portion arranged in said guard recess such that said second fastener does not extend into said protected area farther than said guard first surface.

8. The improvement as set forth in claim 1 and further comprising a rollersupporting member mounted on said hinge section and having a convex outer surface, and wherein said guard is arranged in closely-spaced facing relation to said member such that the transverse cross-sectional shape of said member will be substantially concealed by the transverse cross-sectional shape of said guard.

9. The improvement as set forth in claim 1 wherein said guard has a second surface arranged to engage said leaf portion, has a third surface arranged to engage said panel inner surface, and has a fourth surface arranged to engage said panel inner surface.

10. The improvement as set forth in claim 9 wherein each of said guard third and fourth surfaces continuously engages said panel inner surface along the length of said guard.

11. The improvement as set forth in claim 1 wherein said door includes an adjacent second panel, and wherein said guard is spaced from said knuckle portion by a distance sufficient to permit said panels to move relative to one another when said door is moved between said lowered and raised positions.

* * * * *